US011567609B1

(12) United States Patent
Black et al.

(10) Patent No.: US 11,567,609 B1
(45) Date of Patent: Jan. 31, 2023

(54) FOOT OPERATED POSITION-BASED TOUCHPAD CONTROLLER

(71) Applicant: Sony Interactive Entertainment Inc., Tokyo (JP)

(72) Inventors: Glenn Black, San Francisco, CA (US); Celeste Bean, San Francisco, CA (US); Sergey Bashkirov, Salida, CA (US); Michael Taylor, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/837,253

(22) Filed: Jun. 10, 2022

(51) Int. Cl.
*G06F 3/041* (2006.01)
*G06F 3/01* (2006.01)
*G06F 3/045* (2006.01)
*G06F 3/044* (2006.01)

(52) U.S. Cl.
CPC .......... *G06F 3/04186* (2019.05); *G06F 3/016* (2013.01); *G06F 3/017* (2013.01); *G06F 3/044* (2013.01); *G06F 3/045* (2013.01); *G06F 2203/04104* (2013.01)

(58) Field of Classification Search
CPC .......... G06F 3/011; G06F 3/016; G06F 3/017; G06F 3/04186; G06F 3/044; G06F 3/045; G06F 2203/04104
See application file for complete search history.

(56) References Cited

U.S. PATENT DOCUMENTS

| 10,268,282 | B2* | 4/2019 | Tian ..................... G06F 3/0334 |
| 10,423,241 | B1* | 9/2019 | Pham .................... G02B 27/017 |
| 10,747,336 | B1* | 8/2020 | Pham .................... G06F 3/0325 |
| 2009/0124382 | A1* | 5/2009 | Lachance .............. G06F 3/0334 |
| | | | 345/173 |
| 2017/0364163 | A1* | 12/2017 | Tian ........................ G06F 3/017 |
| 2022/0133572 | A1* | 5/2022 | Bonutti ................ A61B 5/0816 |
| | | | 5/600 |

FOREIGN PATENT DOCUMENTS

KR 101766226 B1 * 8/2008
KR 20150142991 A * 12/2015

* cited by examiner

*Primary Examiner* — Michael Pervan
(74) *Attorney, Agent, or Firm* — JDI Patent; Joshua Isenberg; Robert Pullman

(57) ABSTRACT

A controller apparatus includes a capacitive or resistive touch pad having a touch sensitive surface sized sufficient for operation by two human feet. One or more markers are coupled to the touch pad. The markers are configured for use by a computer system for room mapping.

13 Claims, 10 Drawing Sheets

FOOT OPERATED POSITION-BASED TOUCHPAD CONTROLLER

FIELD OF THE DISCLOSURE

Aspects of the present disclosure relate to a game controller, specifically aspects of the present disclosure relate to foot-controlled game controllers.

BACKGROUND OF THE DISCLOSURE

Virtual Reality (VR) and Augmented Reality (AR) is becoming a more popular medium for home entertainment. VR and AR control currently is limited to room scale movement control or sitting control. In room scale movement control the VR or AR user interfaces with a VR or AR program by moving about a room. Room scale movement control is limited by the size of the user's room and therefore users with small rooms are not able to fully utilize this feature and programs have a hard limitation to the size areas and must use tricks to allow further movement of the user beyond the room size limitations.

Sitting control generally uses a hand-held game controller to control movement within the VR or AR program. A user may control movement in the AR or VR program with one or more joysticks, directional pads or handheld motion controllers. These controllers are limited by being held by the user's hands or manipulated by the user's fingers. The necessity for joystick or directional pad movement control limits the number of inputs available for AR or VR programs. Also, for some users, joystick or directional pad movement control may seem unnatural or imprecise compared to room-scale movement.

Additionally in computer applications, control is generally limited to hand-held game controllers, mice, keyboards and joysticks. While some applications such as racing games and flight simulators may allow the use of foot operated pedals these inputs are application specific and are not usable for general application control.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the present disclosure.

Accordingly, the implementations described below are set forth without any loss of generality to, and without imposing limitations upon, the claimed invention.

According to aspects of the present disclosure the problem of application control in VR and AR may be resolved with the use of a foot operated controller. Additionally, the foot operated controller may provide a valuable control option for users with limited use of their arms or hands. Some simulator controllers use foot operated pedals to simulate real life control apparatus in vehicles such as cars or planes. These pedals do not work well as general purpose game controllers. In the past some older VR systems have strapped the user off center above a large turntable or an omni-directional treadmill allowing them to walk freely while remaining stationary. This past system was bulky and required a lot of space for the turn table or omni-directional treadmill and the straps to hold the user.

Use of a spherical control ball may provide a small device footprint that is controllable with the user's foot or feet and allows the user to sit while using the controller. The spherical control ball provides numerous benefits over previous foot control devices. The spherical shape of the control ball allows the user to move the control ball in any direction without hitting an end stop. This is advantageous for application control because it may provide general purpose control inputs to a computer application. For example, a computer system may use the inputs from the sphere foot operated controller as mouse or track ball inputs for an operating system or an application or as movement inputs for a VR or AR applications.

Figure 1:
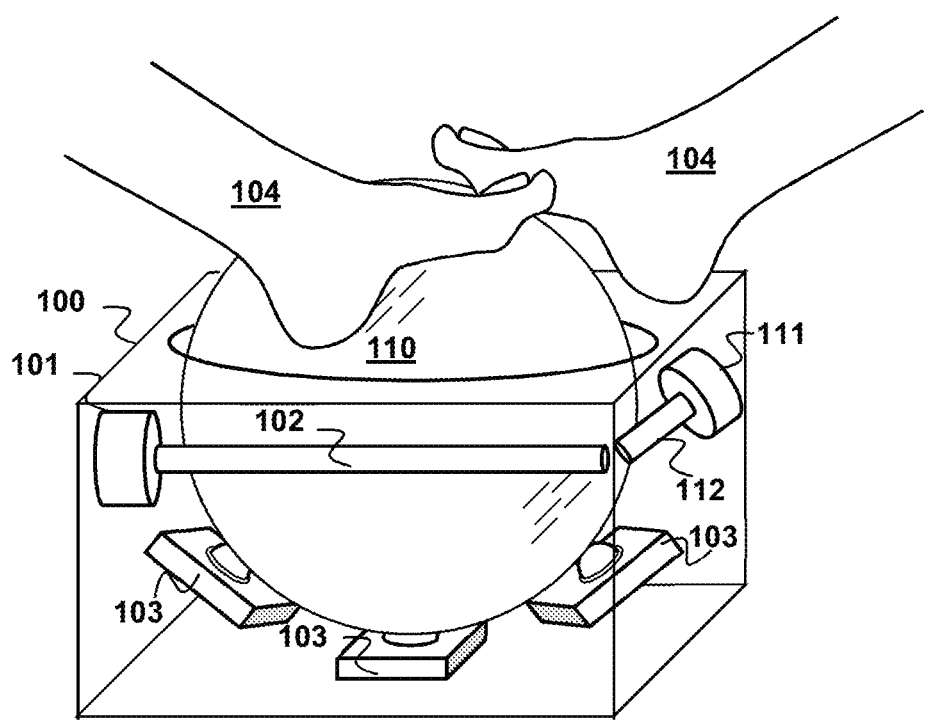
FIG. 1 is a schematic diagram of a single sphere foot operated controller having a rotary motion encoder according to an aspect of the present disclosure.

FIG. 1 schematically depicts a single sphere foot operated controller device having a rotary motion encoder according to an aspect of the present disclosure. The device includes a spherical ball 110 of sufficient diameter to be operable by one foot or two feet of the user. Here the spherical ball is shown with a diameter sufficient to be operable by two feet 104 of the user. By way of example, and not by way of limitation, a size sufficient to be operable by two feet may be a diameter of between 21 and 24 centimeters. The spherical ball may be removable from the device housing 100. The ball 110 is held in place by a support apparatus that supports the ball from below and restricts translation of the ball but enables the ball to freely rotate around its center with respect to at least two axes. This can be achieved by using one or more bearings, low friction contact points, air bearings, rollers, and the like. In some implementations, the ball may be supported by three or more contact points, e.g., ball bearings. In alternative implementations, one or more area contacts may be used, e.g., a ring-like or cup-like contact.

As shown in the non-limiting example depicted in FIG. 1, the support apparatus may include the device housing 100, which may include a circular cavity for the spherical control ball 110. Three or more bearings 103 may be disposed within the circular cavity and in proximity to the spherical control ball 110 when it is installed within the cavity. The spherical ball 110 may be in contact with the three or more bearings 103 and may roll on the three or more bearings during operation. The three or more bearings 103 may be for example and without limitation, plain bearings, rolling element bearings, fluid bearings, magnetic bearings, or composite bearings. An example of a rolling element bearing may be for example ball transfer bearings or simple captive ball bearings located in the cavity. An example of a bushing may be for example a Polytetrafluoroethylene (PTFE) pad attached to an interior surface of the cavity.

The ball 110 desirably is of sufficient weight and rotational inertia to provide a natural and intuitive feel when moved by the user's foot or feet. By way of example and not by way of limitation, the ball may weigh between 2 and 10 kilograms. The rotational inertia depends on the diameter of the ball and the distribution of weight within the ball. Generally speaking, a ball with weight concentrated near the surface of the ball will have a greater rotational inertia than a ball of equal weight and diameter with the weight concentrated near the center of the ball.

In the implementation shown, a rotary motion encoder 101 may be used to measure the rotational displacement of the ball 110 with respect to a first axis. A second rotary motion encoder 111 may be used to measure the rotational displacement of the ball 110 with respect to a second axis. A first shaft or axle 102 may transfer a rotation of the ball 110 to the first rotary motion encoder 101 for the first axis. A second shaft or axle 112 may transfer a rotation of the ball to the second rotary motion encoder 111 for a second axis. The shaft or axles may be made of a metal or plastic that allows slippage of the ball along the non-encoding axes. Alternatively, the shaft or axles may have a surface coating, such as rubber, to provide a desired degree of friction. The rotary motion encoder may be for example and without limitation a mechanical rotary encoder, optical rotary encoder, on-axis magnetic rotary encoder or off-axis magnetic rotary encoder. An optical rotary encoder may for example and without limitation use a light source (e.g., an LED) and a photodiode to detect when a beam of light passes through holes in an incremental rotary encoder wheel. An on-axis rotary encoder may for example use one or more magnets attached to the axel or shaft and a sensing wire coil (also referred to as a hall effect sensor) to detect when the one or more magnets pass by the wire coil. When a magnet passes by the sensing wire coil it may generate a small voltage that may be detected. The changes in voltage may be counted to determine the rotational displacement of the shaft or axel. A mechanical rotary encoder may include energized metal contacts attached to the axel or shaft and a pattern of metal contacts attached to the rotary encoder housing. The pattern of metal contacts attached to the housing may include a gap where the circuit is open, thus changes in current flowing through the circuit may be used to determine the rotational displacement of the shaft by counting spikes in current.

The diameter and circumference of the shafts or axles 102, 112 may be known and the diameter and circumference of the ball 110 may be known. From the rotational rate of the shafts or axels 102, 112, the rotational displacement of the ball 110 may be calculated using the known circumference or diameter of the axles or shafts and the circumference or diameter of the ball. In some implementations, one or more of the bearings 103 may be coupled to a rotary encoder and the rotation of the bearing may rotate a shaft of the rotary encoder. Alternatively, a shaft or axel of a rotary encoder may function as a bearing for the ball. In yet other implementations each rotary encoder shaft is used as bearing for the ball.

Figure 2:
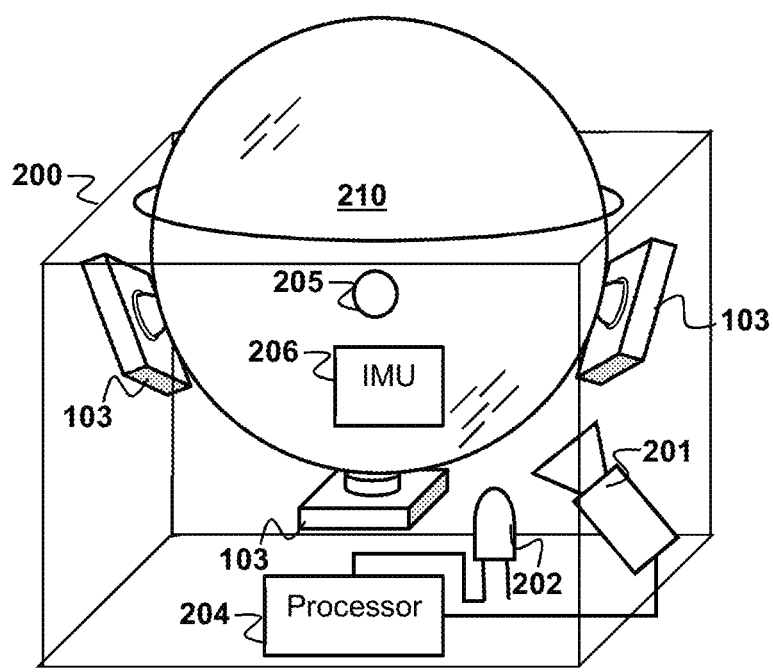
FIG. 2 is a schematic diagram of a single sphere foot operated controller having an image-based motion encoder according to an aspect of the present disclosure.

FIG. 2 schematically depicts a single sphere foot operated controller having an image-based motion encoder according to an aspect of the present disclosure. In the implementation shown an optoelectronic sensor 201 is used to encode the rotational displacement of the ball 210. Similar to above the spherical control ball 210 may rotate on three or more bearings 103. The optoelectronic sensor may detect light reflected off the ball 210 and emitted by a light source 202. The optoelectronic sensor may be for example and without limitation, a camera, video camera, infrared sensor, dynamic vision sensor (DVS) or the like.

The optoelectronic sensor may generate successive image frames of the surface of the ball 210. The camera may use light from the light source 202 to illuminate the surface of the ball 210. A special-purpose image-processor 204 coupled to the optoelectronic sensor as part of the sensor unit. In some alternative implementations, an image processing chip may be integrated with the optoelectronic sensor as part of the same chip or chip package. In some implementations the light source 202 may be communicative coupled to the special purpose image-processor. The special-purpose image-processor may control a light source to turn off and on or change the intensity of the light source at a rate to generate images or events of the ball. An inertial measurement Unit (IMU) 206 such as, for example accelerometers, gyroscopes, and/or magnetometer may be coupled to the ball 210. A computing system or specialized processor may use the IMU to refine the rotational displacement of the ball. The system or processor may also use information from the IMU to determine when to turn on the light source 202. The IMU 206 may wirelessly communicate with the system or specialized processor. Alternatively, the IMU may communicate through a light emitted through the ball and photodetectors or through a metal contact on the surface of the ball and a contactor coupled to the device housing 200.

The relative position or orientation of the ball 210 may be tracked using the optoelectronic sensor 201 with a technique commonly known as digital image correlation. According to this technique, the sensor 201 captures a sequence of two or more images in continuous succession and compares successive images to each other to determine how far an object within the images has moved and in what direction. The comparison may be envisioned as a process of aligning features common to two successive images and determining how much overhang there is at the edges of the two images to determine the vertical and horizontal offset between them. The offsets in the vertical and horizontal can then be used to determine the rotational displacement of the ball 210. To aid in determination of the digital correlation, the ball 210 may include a random or semirandom texture or color pattern on its surface. In some alternative implementations a light source 205 may be internal to the ball. The surface of the ball may be clear or translucent or the ball may have one or more light pipes or optical wave guides configured to transmit light from the light source 205 at the interior of the ball and emit the light at the surface of the ball.

The optoelectronic sensor may capture a large number of successive images (e.g., one thousand or more) per second. Depending on how fast the ball is rotating, each image will be offset from the previous one by a fraction of a pixel or as many as several pixels. These images may be processed using cross correlation to calculate how much each successive image is offset from the previous one. Such calculations may be done, e.g., by the special purpose image processing chip 204 associated with the sensor unit 201.

By way of example, and not by way of limitation, the optical sensor 201 may be an image sensor having an 18×18 pixel array of monochromatic pixels. A greater or lesser number of pixels may be used. The sensor 201 may share an application specific integrated circuit (ASIC) 204 used for storing and processing the images. In some implementations, the correlation processing may be accelerated by using information from previous motions. Some implementations may further refine correlation processing to prevent deadbands when the ball moves slowly by adding interpolation or frame-skipping. In some implementations the optoelectronic sensor 201 may be a dynamic vision sensor (DVS). The DVS may generate events when there are changes in light intensity. The event update rate of a DVS may be so large as to be near continuous, e.g., about 1 million events per second. The light source 202 may be turned on and off at a predefined rate to generate events capturing the state of the surface of the ball 210. The processor 204 may store, aggregate events and process events like images.

Force Feedback

Force feedback may be defined as changing the feel of operation of a control unit. Force feedback according to aspects of the present disclosure may change the weight of the control ball, apply rotational or counter-rotational force to the control ball or reduce the rotational velocity of the control ball, or apply a vibration to the ball or the entire device. These operations may change the feel of the control ball to the user giving them some sense of interaction or improved interactions with the system they are interfacing.

Figure 3:
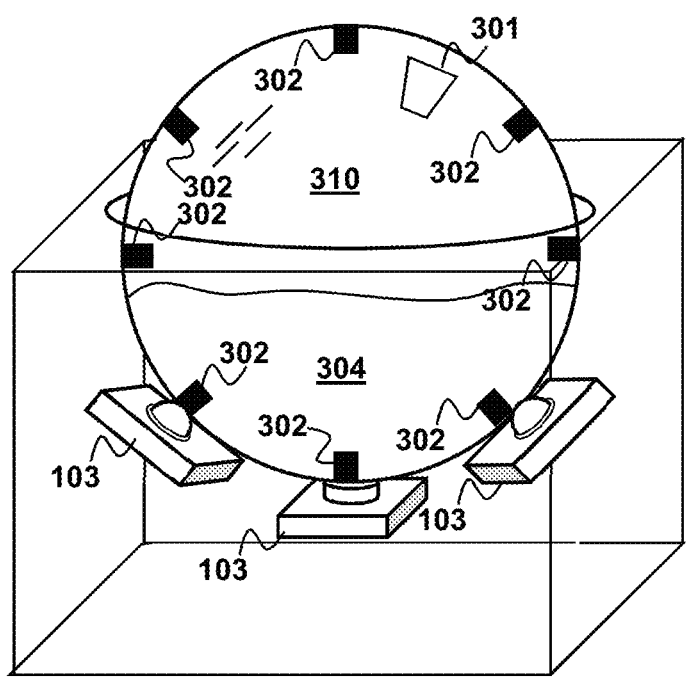
FIG. 3 is a schematic diagram of a single sphere foot operated controller having an adjustable weight using a granular material or liquid according to an aspect of the present disclosure.

FIG. 3 is a schematic diagram of a single sphere foot operated controller having an adjustable weight using a granular material or liquid according to an aspect of the present disclosure. In the implementation shown the ball 310 includes an internal cavity. The ball 310 may also include a fill port 301 for adding a granular material or liquid 304 to the internal cavity. Adding or removing granular material or liquid 304 may change the tactile feel of moving the ball by changing the weight or rotational inertia of the ball 310. The internal cavity of the ball may include one or more features 302 configured to interact with the granular material or liquid 304. The one or more features may be, by way of example and not by way of limitation, a texturized surface, raised structures, paddles, or fissures on an internal surface of the ball 310. A granular material may be for example and without limitation, sand, metal shot, rocks, beans, flour or similar. A liquid may be, by way of example and not by way of limitation a Newtonian fluid such as water or a non-Newtonian fluid such as water and corn starch mixture sometimes referred to as Oobleck. The liquid may be chosen such that its viscosity affects movement of the ball 310 in a desired way when it is manipulated with the feet. The surface contact properties of the liquid and the inside surface of the ball may also be chosen so that the degree of "stickiness" of the liquid to the inside of the ball produces a desired effect on the movement of the ball when it is manipulated with the feet.

Figure 4:
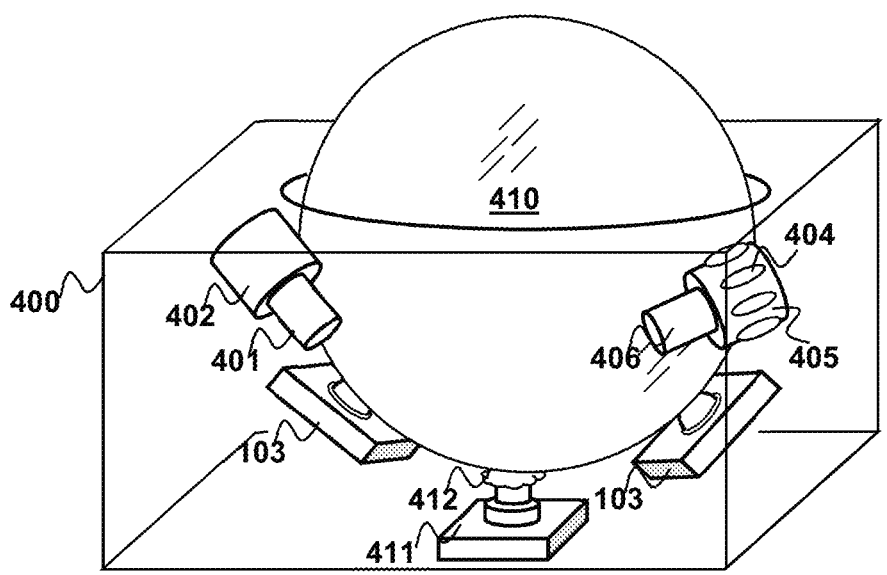
FIG. 4 is a schematic diagram of a single sphere foot operated controller having braking elements according to an aspect of the present disclosure.

FIG. 4 is a schematic diagram of a single sphere foot operated controller having braking elements according to an aspect of the present disclosure. In this implementation braking elements, braking elements are used to change the tactile feel of the rotation of the ball 410. Multiple types of braking elements are shown in FIG. 4, but implementations may use a single type of braking element. One type of braking element shown is a passive braking system including a brake pad 412 coupled to an actuator 411, the brake pad being in proximity to the ball 410. The actuator 411 may push the brake pad 411 onto the surface of the ball slowing the rotation of the ball. The brake pad may be for example and without limitation, a rubber, plastic, fabric, or other surface providing increased friction between the surface of the ball and the actuator. Another type of braking element shown is an active braking element including electric motors 401, 406. The Output shafts of the electric motors 401, 406 are connected rollers 402, 405 which may transfer a rotation of the output shaft to the ball 410. Two types of rollers are shown, here a first type of roller, may be a simple roller 402. The simple roller may be for example and without limitation a wheel made of a plastic, rubber, PTFE or similar. The first type of roller 402 may provide traction or friction in one axis of rotation while allowing a limited amount of slippage in other axes of rotation. The second type of roller 405 may be an omni-directional wheel. The omni-directional wheel 405 may include counter-wheels 404 that rotate in an axis perpendicular to the roller 404. The counter-wheels 404 make contact with ball 410 and allow the ball to rotate along an axis perpendicular to the axis of rotation of the output shaft of the electric motor 406. In some alternative implementations, the bearings 103 may include an electric motor or braking elements. The electric motor may exert a rotational force on the bearing to provide a rotational force to the ball. The braking elements coupled to the bearings may apply a braking force on the bearing to apply the braking force to the ball.

In some implementations the bearings 103 may be coupled to vibrational elements such as a vibration motor or speaker. A vibration motor may be for example and without limitation, an eccentric mass vibrating motor or linear resonant actuator. In yet other implementations, the vibrational elements may be attached to the housing 400. The vibrational elements may impart a vibration to the ball itself through the housing and may provide additional useful feedback to the user.

Figure 5A:
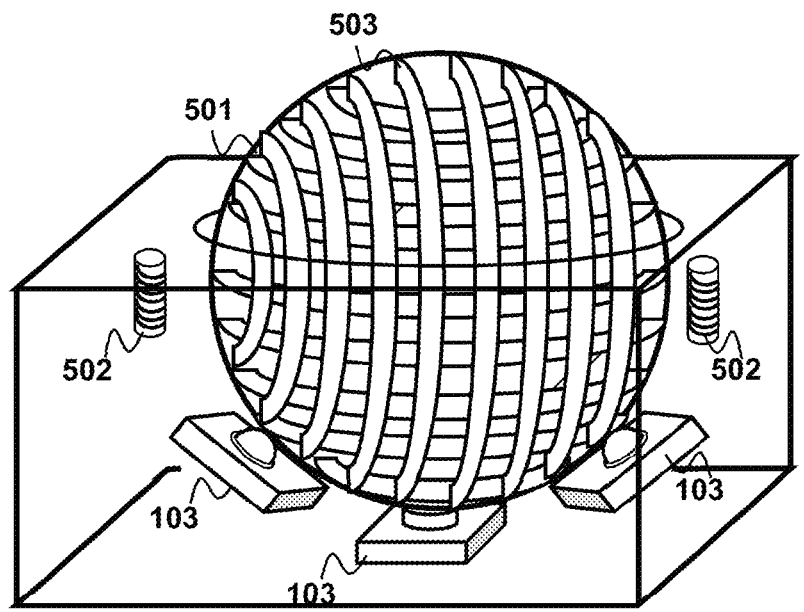
FIG. 5A is a schematic diagram of a single sphere foot operated controller having an electromagnetic braking element according to an aspect of the present disclosure.

FIG. 5A schematically illustrates a single sphere foot operated controller having an electromagnetic braking element according to an aspect of the present disclosure. In the implementation shown, the ball 501 includes ferromagnetic elements 503 that interact with one or more electromagnetic braking elements 502. In some implementations the ferromagnetic elements 503 may be metal weights in the internal cavity of the ball. The metal weights may be attachable to an internal wall of the cavity of the ball via an attachment means for example and without limitation, fasteners, glues, welds, and the like. Fasteners may for example and without limitation, include screws, plastic stakes, brackets, rivets, clips or the like. In some alternative implementation the metal weights are free-floating inside the ball or held in place within the internal cavity by friction. In some implementations interchangeable ferromagnetic weights may be used to change the feel or weight of the ball 501. In alternative implementations the ball 501 may be made from a ferromagnetic material. A coating may be applied to the surface of the ball to provide a better grip surface and additional texture for the user. The coating may be, by way of example and not by way of limitation, a rubberized coating, plastic coating, enamel coating or similar.

The electromagnetic braking elements 502 may be for example and without limitation, electromagnets or semiconductor magnets or any other device or material configured to generate a magnetic field when a current or voltage is applied to the device or material. Here, the electromagnetic elements 502 are arranged in proximity to the ball 501. The ferromagnetic elements 503 may be arranged in a checkerboard, striped, or crisscross pattern. Such a pattern of ferromagnetic elements 503 may allow the magnetic field created by the electromagnetic elements 502 to interact with portions of the ball when active. These interactions may be used to slow a rotation of the ball 501.

In this implementation the electromagnets 502 may be used to detect a displacement of the ball via the Hall Effect, similar to a rotary encoder. Additionally, one or more of the electromagnets 502 may be energized to reduce rotation of the ball and/or apply force feedback.

It is noted that in the configuration shown in FIG. 5A the electromagnets 502 are located outside the ball 501 and the permanent magnets are located on or inside the ball. In alternative implementations, the configuration shown in FIG. 5A may be reversed, with ferromagnetic elements arranged outside the ball 501 and electromagnetic elements located on or inside the ball.

Figure 5B:
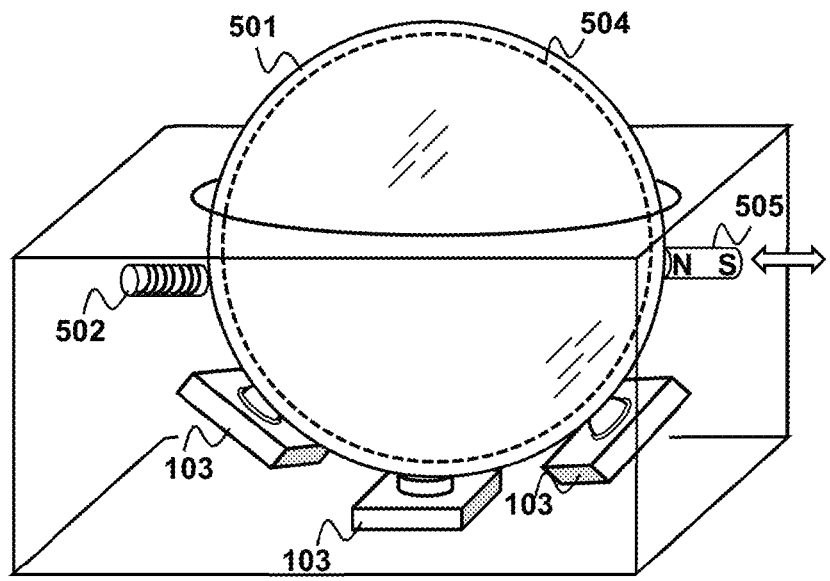
FIG. 5B is a schematic diagram of a single sphere foot operated controller having an electromagnetic braking element according to an alternative aspect of the present disclosure.

An alternative implementation shown in FIG. 5B may use eddy current braking. In this implementation, the ball 501 includes a metallic shell layer 504, e.g., copper or aluminum and the brake would be one or more electromagnets 502 with one of their poles close to the ball. Eddy currents are produced in the metal shell layer 504 when the ball 501 rotates and the electromagnets 502 are energized. The eddy currents produce a magnetic field that tends to counter the field of the electromagnet resulting in a braking force on the ball. Alternatively, permanent magnets could be used instead of the electromagnets 502 and the braking force changed by moving the magnets closer to or farther from the ball. Additional examples of such implementations include combinations of the electromagnets and permanent magnets. For example, the electromagnets 502 could be configured to move with respect to the ball 501. Alternatively, braking force could be apply by a combination of permanent magnets (moving or non-moving) and electromagnets (moving or non-moving).

Dual Sphere Foot Operated Controller

Figure 6:
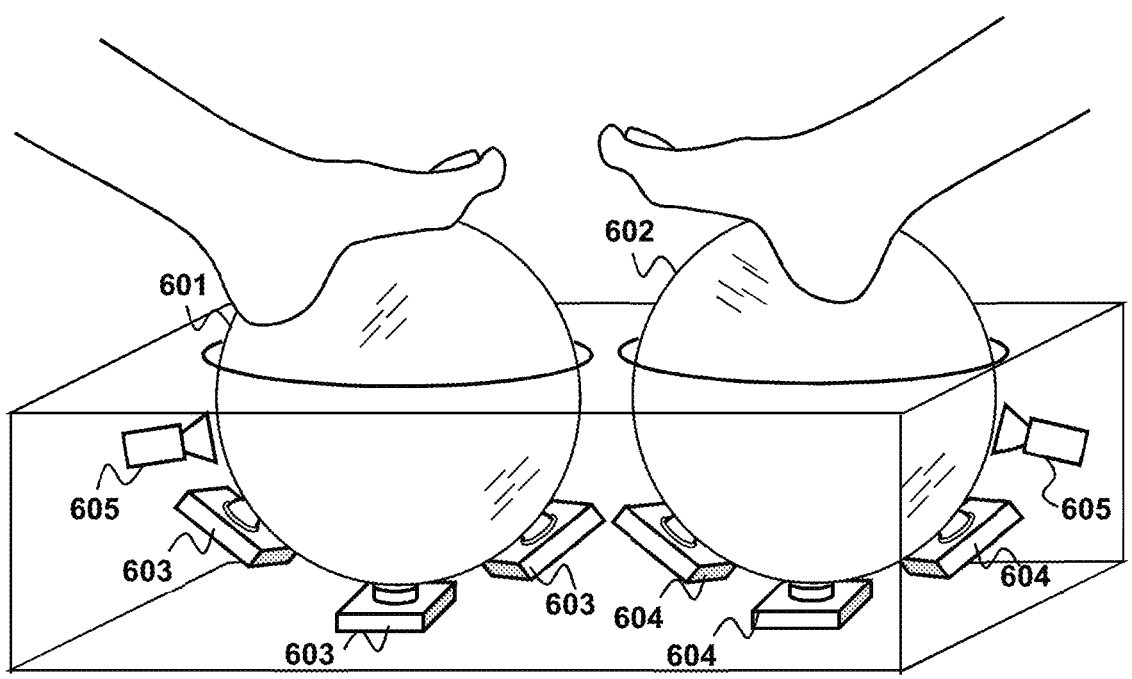
FIG. 6 is a schematic diagram of a dual sphere foot operated controller according to an aspect of the present disclosure.

In some implementations of the present disclosure, it may be advantageous to include two smaller spherical balls in the controller. These two balls may be used in tandem to control an application. FIG. 6 is a schematic diagram of a dual sphere foot operated controller according to an aspect of the present disclosure. In this implementation a first control ball 601 and a second control ball 602 are used in the device. Each of the first ball 601 and the second ball 602 may be sized sufficient to be operated with a single foot. By way of example and not by way limitation the balls 601, 602 may have a diameter between 12 and 24 centimeters. In some implementations the balls 601, 602 are equally sized. In some alternative implementation the first ball 601 may be larger than the second ball 602. This implementation may be useful for an application with a primary directional input and a secondary, less important, directional input.

The balls 601, 602 are held in place by corresponding support apparatus that support the balls from below and restrict their translation while allowing them to freely rotate around their centers with respect to at least two axes. As discussed above, this can be achieved by using one or more bearings, low friction contact points, air bearings, rollers, and the like. In some implementations, the ball may be supported by three or more contact points, e.g., ball bearings. In alternative implementations, one or more area contacts may be used, e.g., a ring-like or cup-like contact.

As shown in the non-limiting example depicted in FIG. 6, and as discussed above with respect to the single sphere foot operated device, the support structure for the first ball 601 in the dual sphere device include three or more bearings 603. Similarly, the second ball 602 may rotate on three or more bearings 604. As discussed, the bearings may be for example and without limitation, plain bearings, rolling element bearings, fluid bearings, magnetic bearings, or composite bearings.

A rotational displacement of each ball may be determined using a suitable encoder 605, e.g., a rotary encoder or an image-based encoder as discussed above with respect to a single ball implementation in FIG. 1 and FIG. 2, respectively. In some implementations the balls share a rotational displacement determination sensor type. In alternative implementations the first ball 601 has a different rotational displacement sensor type than the second ball 602. By way of example and not by way of limitation the first ball may be coupled to an optical rotary encoder and a rotational displacement of the second ball may be detected by an image-based encoder. Alternatively for example and without limitation the first ball may be coupled to and transmit rotation to an input of a magnetic rotary encoder and the second ball may be coupled to and transmit rotation to an input of an optical rotary encoder.

Force feedback may be applied to each of the balls 601, 602 similar to the examples discussed in the force feedback section and FIGS. 3-5. Force feedback may be applied to the first ball 601 or both the first ball 601 and the second ball 602. Force feedback may be applied in any way discussed with respect FIGS. 3-5 and the manner which force feedback is applied to the balls may differ between the first ball 601 and the second ball 602. For example and without limitation, the first ball may have force feedback applied using an active braking element such as an electric motor and roller while the second ball has force feedback applied using a passive braking element such as a brake pad and actuator. In some alternative implementations each of the balls 601, 602 may have the same force feedback type.

In some implementations the dual sphere foot operated controller may include two single sphere foot operated controllers connected via an interface. Each single sphere foot operated controller may include a controller interface port such as a Universal serial bus (USB), Serial Bus, PS/2 port or the like. Each single sphere foot controller may include a first interface port for communication with a computer system and a second communication port for communication with another controller according to aspects of this implementation. A first single sphere foot controller may be designate as the primary controller which is communicatively coupled to a secondary single sphere foot controller and communications pass-through primary controller to reach the computer system. Here, communicatively coupled means that a signal may be passed from a source to a destination through any number of relay elements and the format of the signal may change but the informational content of the signal remains intact. In some alternative implementations each of the single sphere foot controllers are communicatively coupled to a computer system and the computer system combines the inputs with an application.

Foot Operated Touch Pad Controller

Figure 7:
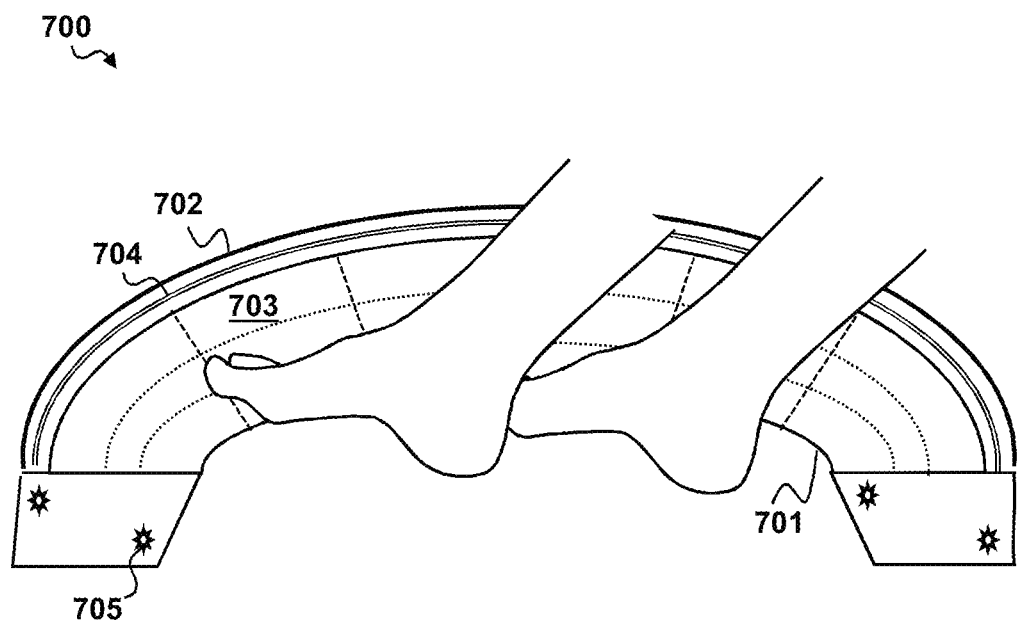
FIG. 7 is a schematic diagram of a flat touch pad foot operated controller according to an aspect of the present disclosure.

FIG. 7 is a schematic diagram of a touch pad foot operated controller 700 according to an aspect of the present disclosure. In the implementation shown a touch pad 701 is attached to a controller housing 702. As depicted in FIG. 7, the touch pad 701 is flat, although aspects of the present disclosure are not limited to such implementations. The touch pad 701 may include a curved touch sensitive surface 703. The touch sensitive surface 701 may be sufficiently sized to be operated by two feet. The semi-circular bowl may provide a greater accessible surface area for foot use.

The touch sensitive surface 703 may be, by way of example and not by way of limitation, a capacitive touch sensitive surface, resistive touch sensitive surface or similar. The touch sensing surface of a capacitive sensor is formed by two concentrically shaped metal electrodes of an unwound capacitor. When an object nears the sensing surface it enters the electrostatic field of the electrodes and changes the capacitance in an oscillator circuit. As a result, the oscillator begins oscillating. The trigger circuit reads the oscillator's amplitude and when it reaches a specific level the output state of the sensor changes. As the target moves away from the sensor the oscillator's amplitude decreases, switching the sensor output back to its original state.

A diamond pattern of capacitive sensors may be used in the touch sensitive surface. The diamond pattern may be up to 20 times larger, e.g., 5 to 20 times larger, in a diagonal dimension than typically used for finger tracking and the insulation layer may be thicker compared to a touch surface configured for finger use. The average foot width is 80 mm to 130 mm compared to the average index finger width which is 10 mm to 20 mm. By way of example, and not by way of limitation, if a capacitive sensor used for finger detection has a diagonal dimension of 5 mm. a capacitive sensor for a foot operated touch sensor may be 40 mm in the diagonal dimension. The thickness of the insulating layer may be scaled with the diagonal dimension to maintain the proper sensing capacitance.

The layout of the sensor elements in the array depends on the specific application. As non-limiting examples, the sensor elements could be arranged in a square, rectangular, triangular, circular, elliptical or arbitrarily shaped pattern. By way of example, and not by way of limitation, the sensor could have an array of elements that fill up a semi-circle with a radius of 1.5-2 feet.

Some implementations may have a mechanical edge 704, e.g., a rumble strip to mark the boundary of the sensor element array. In some such implementations, the edge may be controllable. E.g., the edge could be raised to keep user within bounds or lowered to allow user to gesture beyond the edge. In some other implementations, the edge could include a pressure sensor that could provide an additional general-purpose input.

A touch sensitive surface of a resistive touch sensor may include two grids of conductive wires separated by a resistive gap. The resistive gap is bridgeable by pressure applied to a side of the conductive grids. The resistive gap may be for example and without limitation an air gap or a gap filled with an electrically resistive fluid. To create the air gap, a resistive space may be placed between the two grids. One grid of the two conductive grids may be energized and the conduction electricity of a particular set of wires in the non-energized grid from the energized grid may be used to determine the location of a touch. In some alternative implementations there may be a single non-energized wire grid and a continuous surface for the energized side. The outer surface of the resistive touch screen may be coated with an insulative coating to prevent shock or current leakage. The size of the grid may be up to 20 times larger than the grid size of a finger operated resistive touch screen to accommodate the large touch surface supplied by user's feet.

Certain implementations may take advantage of the fact that the touchpad is on the floor for use in augmented reality (AR) or virtual reality (VR) applications. For example, we could use that fact to anchor the floor to define the ground plane for VR. Currently, you have to bend over while wearing the headset to define where the floor is. For example, one or more markers 705 coupled to the touch pad may be configured for use by a computer system for room mapping. The markers 705, e.g., indicia or light sources, may be configured for use by the computer system to determine a floor plane. Specifically, the markers may be located on or near the level of the floor and identifiable in images obtained with a camera. Furthermore, the markers may be in a known configuration with respect to each other. The computer system may analyze the image and use the locations of the markers within the image and their known relative locations to define the location of the floor.

Figure 8A:
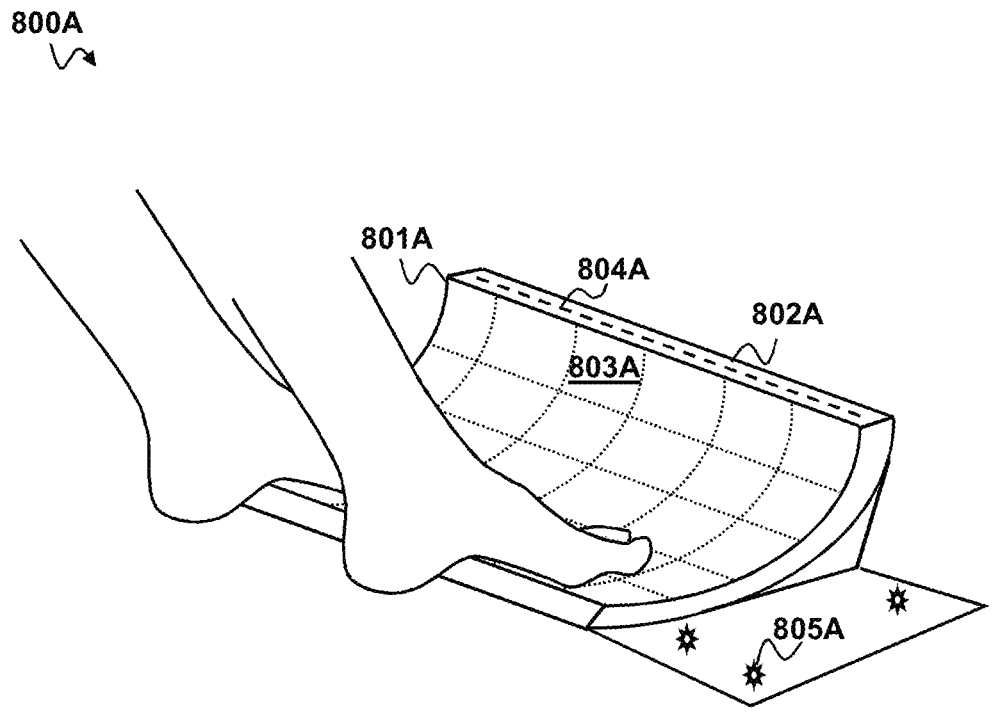
FIG. 8A is a schematic diagram of a touch pad foot operated controller being curved in a single dimension according to an aspect of the present disclosure.

FIG. 8A shows an example of a touch pad foot to controller 800A that is curved in a single dimension according to an aspect of the present disclosure. In this implementation the touchpad 801A and the device housing 802A are curved in a single dimension. As shown the touch pad 801 is curved in the X dimension and tilted so that users may comfortably access the entire touch surface 803A with their feet. Curving the touch pad as shown may provide a larger surface area for the user to access while sitting down without moving. In some implementation the curve of the touch surface 803A of the touch pad 802A may have a curve that matches the range of motion of the user's, hips, knees and feet. For example and without limitation, the touch surface may have a 150 degree curve to match the average range of motion of the knees.

Some implementations may include a mechanical edge 804A, e.g., a rumble strip to mark the boundary of the sensor element array as well as markers 805A for use in defining a floor plane, as discussed above.

Figure 8B:
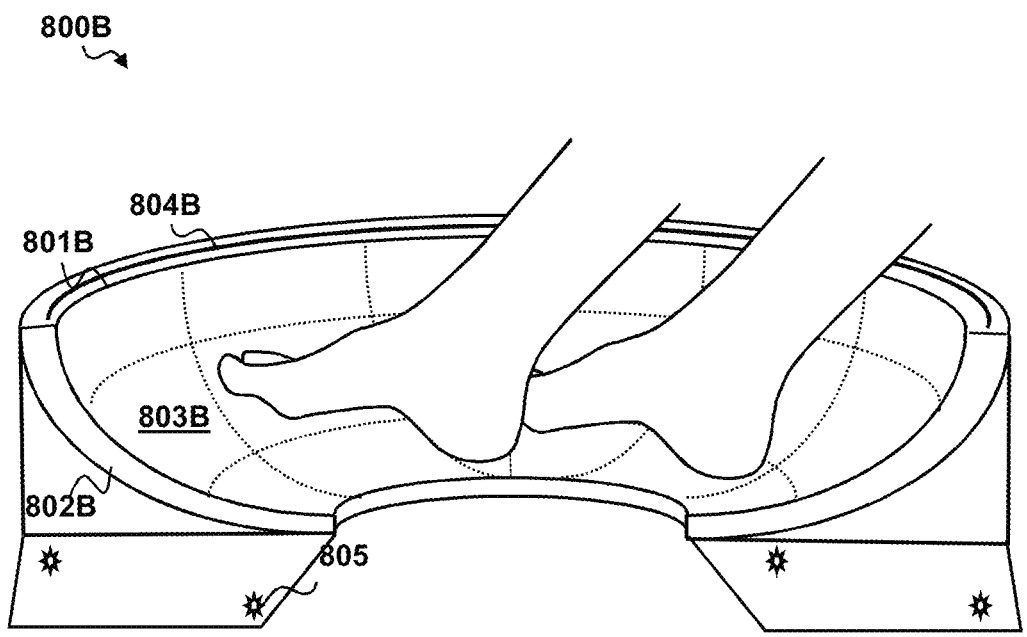
FIG. 8B is a schematic diagram of a touch pad foot operated controller being curved in two dimensions according to an aspect of the present disclosure.

As depicted in FIG. 8B, an alternative foot-operated controller 800B may include a housing 802B and a touch pad 801B that is curved in two dimensions creating a semi-circular bowl shape, as shown. The curved touch pad 801B may include a curved touch sensitive surface 803B. The touch sensitive surface 803B may be sufficiently sized to be operated by two feet. The semi-circular bowl shape may provide a greater accessible surface area for foot use. Some implementations may include a mechanical edge 804B, e.g., a rumble strip to mark the boundary of the sensor element array as well as markers 805B for use in defining a floor plane, as discussed above.

Figure 9A:
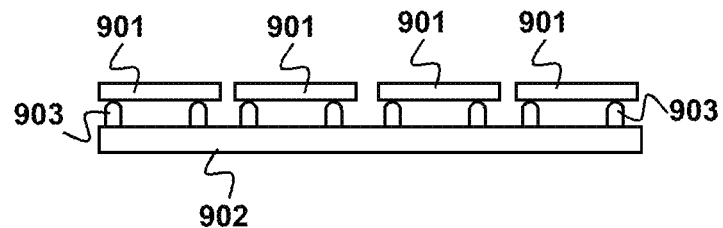
FIG. 9A-9C are a schematic diagrams of a touch pad foot operated controller having a multiple moveable touch sensitive arrays according to an aspect of the present disclosure.
Figure 9B:
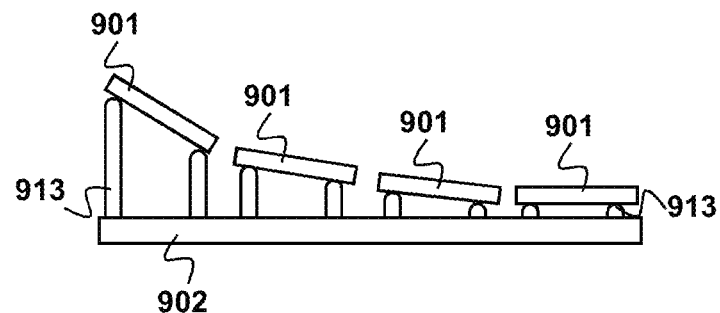
Figure 9C:
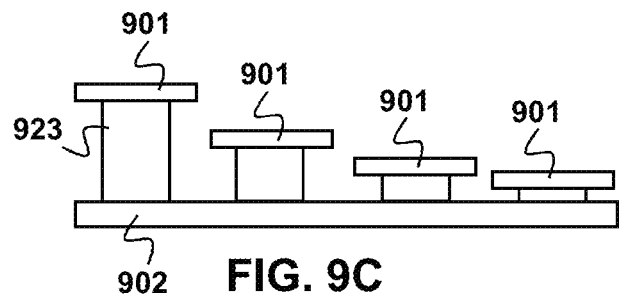

In some implementations the touch pad may be movable to accommodate a range of motion of the user's joints. FIG. 9A-9C are schematic diagrams of a touch pad foot operated controller having multiple moveable touch sensitive arrays according to an aspect of the present disclosure. In the implementation shown in FIG. 9A the touch sensitive surface includes one or more movable touch sensitive arrays 901. The movable touch sensitive arrays 901 may be attached to the controller housing 902 via one or more movable support rods 903.

Each movable support rod 903 may be coupled to the touch sensitive array via a movable joint by way of example and without limitation, a ball joint, or hinge. The movable support rods may be coupled to and move by an actuator for example and without limitation a linear actuator used to change the height of the one or more touch sensitive surfaces from a bottom of the housing 902. In some implementations a height of one or more of the actuator-controlled support rods 903 may be changed based on an application running on a computer system. The application may change the height of one or more of the support rods to simulate a virtual environment. In some other implementations the heights of each of the actuator-controlled support rods 903 may be set by the user. Alternatively, the movable support rods may be an unpowered suspension mechanism such as piston with check valve used to maintain a height above the bottom of the housing that is manually set by the user. As shown each touch sensitive array 901 may be supported by two rods 903 providing the front and back of each touch sensitive array 901 an independently adjustable height.

As shown in FIG. 9B the differing heights of the movable support rods 913 allow the touch surfaces 901 to have a varying tilt. In some implementations three or more support rods may couple the touch sensitive arrays to the housing. Three or more support rods may allow the touch sensitive areas to be tilted in two dimensions. For example and without limitation, three or more support rods may allow a first corner of a touch sensitive array to be lower or higher than all other corners in the touch sensitive array. The tilt and heights of the touch sensitive arrays 901 here have been arranged to provide a curved touch surface for the user. In some implementations an application may vary the tilt of each touch surface to simulate a virtual environment.

FIG. 9C depicts an alternative implementation of the multiple moveable touch sensitive arrays according to an aspect of the present disclosure. Here each touch sensitive array 901 is coupled to a single support rod 923. Each support rod 923 may be connected to a touch sensitive array via a movable joint for example and without limitation ball joint, or hinge. Here, the height of the support rod 923 may be controlled by an actuator. Additionally, the movable joint between the support rod 923 and the touch sensitive array 901 may be controlled by a joint actuator. The actuator-controlled joint may allow a tilt of the touch sensitive array to be controlled independently of the height.

In some alternative implementations there may be two support rods, supporting each touch sensitive array with a first rod on a first side of the touch sensitive array and a second rod a second side of the array. In this implementation an inclination of a movable joint may be controlled by a joint actuator either first movable joint between the touch sensitive array and the first support rod or a second movable joint between the second support rod and the touch sensitive array or both.

The curve of the touch screen or changes in the height and/or tilt of the touch sensitive arrays may cause a lack of continuity or uniformity in control operation. A distortion map may be applied to inputs received from the touch sensitive foot operated controller to compensate for the lack of continuity or uniformity in control operation. The distortion map may take discontinuous inputs and map them to a uniform surface. By way of example and not by way of limitation the distortion map may take an input on an edge of a first touch sensitive array and an input on a second touch sensitive array that is a predetermined distance from the first touch sensitive array and interpolate a touch event between the two arrays in a line for the predetermined distance. The known size, shape and location of each of the touch sensitive arrays in the device may be used to create a flat map of inputs from touch events generated on the discontinuous touch sensitive arrays. The distortion map for curved touch sensitive surfaces may simply transform the curved inputs to a flat input space.

System

Figure 10:
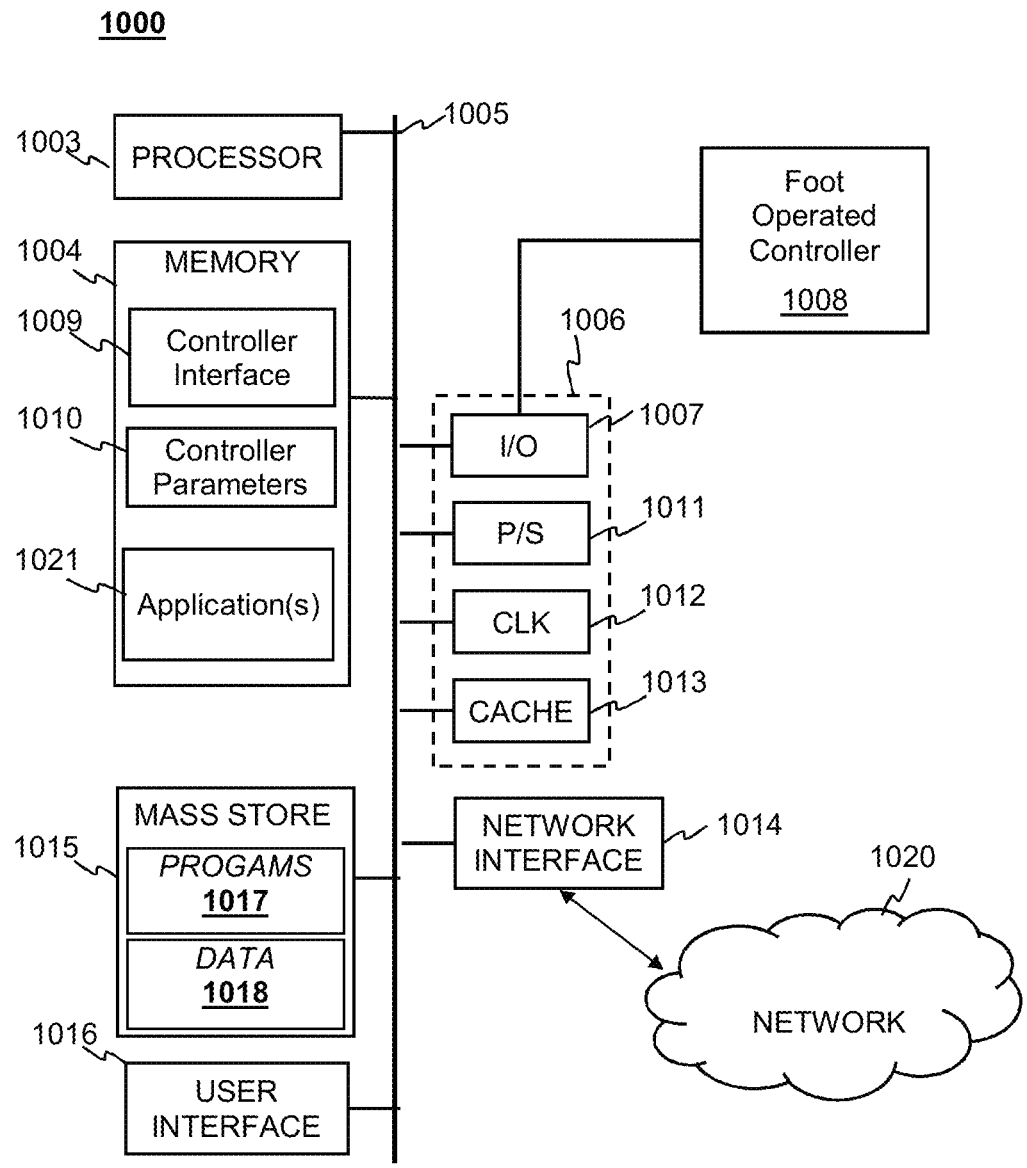
FIG. 10 is a system diagram depicting a system having a foot operated controller according to an aspect of the present disclosure.

FIG. 10 is a system diagram depicting a system having a foot operated controller according to an aspect of the present disclosure. By way of example, and not by way of limitation, according to aspects of the present disclosure, the system 1000 may be an embedded system, mobile phone, personal computer, tablet computer, portable game device, workstation, game console, and the like.

The system 1000 generally includes a central processor unit (CPU) 1003, and a memory 1004. The system 1000 may also include well-known support functions 1006, which may communicate with other components of the system, e.g., via a data bus 1005. Such support functions may include, but are not limited to, input/output (I/O) elements 1007, power supplies (P/S) 1011, a clock (CLK) 1012 and cache 1013.

The system 1000 includes a mass storage device 1015 such as a disk drive, CD-ROM drive, flash memory, solid state drive (SSD), tape drive, or the like to provide non-volatile storage for programs and/or data. The system 1000 may also optionally include a user interface unit 1016 to facilitate interaction between the system 1000 and a user. The user interface 1016 may include a keyboard, mouse, joystick, light pen, or other device that may be used in conjunction with a graphical user interface (GUI). The system 1000 may also include a network interface 1014 to enable the device to communicate with other devices over a network 1020. The network 1020 may be, e.g., a local area network (LAN), a wide area network such as the internet, a personal area network, such as a Bluetooth network or other type of network. These components may be implemented in hardware, software, or firmware, or some combination of two or more of these.

A foot operated controller 1008 is communicatively coupled to processor 1003 through, for example the I/O 1007. The foot operated controller may be for example a single spherical foot operated controller such as those shown in FIGS. 1-5, a dual sphere foot operated controller as shown in FIG. 6 or a touch sensitive foot operated controller such as shown in FIGS. 7-9C.

The CPU 1003 may include one or more processor cores, e.g., a single core, two cores, four cores, eight cores, or more. In some implementations, the CPU 1003 may include a GPU core or multiple cores of the same Accelerated Processing Unit (APU). The memory 1004 may be in the form of an integrated circuit that provides addressable memory, e.g., random access memory (RAM), dynamic random-access memory (DRAM), synchronous dynamic random-access memory (SDRAM), and the like. The main memory 1004 may include one or more applications 1021 used by the processor 1003 to generate for example, control parameter 1010. The main memory 1004 may also include a controller interface used to adjust controller parameters 1010. The controller parameters 1010 in memory may be sent to the foot operated controller 1008 to operate aspects of the foot operated controller such as for example and without limitation, force feedback, support rod height, movable joint tilt, and similar. Additionally, the controller parameters 1010 may include control information received from the foot operated controller which may be, by way of example and not by way of limitation, rotational displacement or relative motion.

The Mass Storage 1015 may contain applications or programs 1017 portions of which may be loaded to the main memory 1004 for processing. Additionally, the mass storage 1015 may contain data 1018 used by the processor to load controller parameters 1010 into memory 1004.

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
  One or more processor cores (e.g., microcontroller, microprocessor, or digital signal processor (DSP) cores.
  Memory blocks, e.g., read only memory (ROM), random access memory (RAM), electrically erasable programmable read-only memory (EEPROM) and flash memory.
  Timing sources, such as oscillators or phase-locked loops.
  Peripherals, such as counter-timers, real-time timers, or power-on reset generators.
  External interfaces, e.g., industry standards such as universal serial bus (USB), FireWire, Ethernet, universal asynchronous receiver/transmitter (USART), serial peripheral interface (SPI) bus.
  Analog interfaces including analog to digital converters (ADCs) and digital to analog converters (DACs).
  Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC. A typical SoC includes both the hardware components described above, and executable instructions (e.g., software or firmware) that controls the processor core(s), peripherals, and interfaces.

Aspects of the present disclosure provide for foot-operated controllers with a degree of precision, intuitive operation, and wide range of motion. Such controllers may be advantageously used in computer gaming applications but also may be used as input devices for general-purpose computers. Additionally, foot-operated controllers may provide greater control options for users and may be used in addition to a hand-held controller.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A controller apparatus, comprising:
  a capacitive or resistive touch pad having a touch sensitive surface sized sufficient for operation by two human feet;
  one or more markers coupled to the capacitive or resistive touch pad wherein the markers are configured for use by a computer system for room mapping.

2. The apparatus of claim 1 wherein the one or more markers configured for use by the computer system to determine a floor plane.

3. The apparatus of claim 1 wherein the touch pad includes a mechanical edge to mark the boundary of the touch sensitive surface.

4. The apparatus of claim 3 wherein the mechanical edge includes a vibration element configured to vibrate when a touch nears the edge of the touch surface.

5. The apparatus of claim 3 wherein the mechanical edge includes a raisable edge of the touch surface, wherein the raisable edge is configured to be lowered to allow a foot gesture off the touch surface.

6. The apparatus of claim 3 wherein the mechanical edge includes an additional touch sensor wherein the additional touch sensor is used as an alternative input to the computer system.

7. The apparatus of claim 1 wherein the touch surface of the touch pad is flat.

8. The apparatus of claim 1 wherein the touch surface of the touch pad is curved.

9. The apparatus of claim 8 wherein touch surface is curved in one dimension.

10. The apparatus of claim 8 wherein touch surface is curved in two dimensions.

11. The apparatus of claim 1 wherein the touch sensitive surface includes two or more movable touch sensitive arrays located proximal to each other.

12. The apparatus of claim 11 wherein the two or more movable touch sensitive arrays are each coupled to an actuator wherein the actuator is configured to move the touch sensitive arrays.

13. The apparatus of claim 11 wherein a distortion map is applied to inputs from the two or more movable touch sensitive array to account for the position of the two or more movable touch sensitive arrays.

* * * * *